US011975559B2

(12) United States Patent
Jeong

(10) Patent No.: US 11,975,559 B2
(45) Date of Patent: May 7, 2024

(54) TRAY STORAGE

(71) Applicant: Do Cheon Jeong, Seoul (KR)

(72) Inventor: Do Cheon Jeong, Seoul (KR)

(73) Assignee: INFOCREATIVE CO., LTD., Seoul (KR)

( * ) Notice: Subject to any disclaimer, the term of this patent is extended or adjusted under 35 U.S.C. 154(b) by 0 days.

(21) Appl. No.: 17/617,528

(22) PCT Filed: Nov. 2, 2021

(86) PCT No.: PCT/KR2021/015711
§ 371 (c)(1),
(2) Date: Dec. 8, 2021

(87) PCT Pub. No.: WO2022/169069
PCT Pub. Date: Aug. 11, 2022

(65) Prior Publication Data

US 2024/0025201 A1 Jan. 25, 2024

(30) Foreign Application Priority Data

Feb. 2, 2021 (KR) ........................ 10-2021-0014976
Apr. 26, 2021 (KR) ........................ 10-2021-0053752

(51) Int. Cl.
*B65D 5/38* (2006.01)
*B42F 7/14* (2006.01)

(52) U.S. Cl.
CPC ................ *B42F 7/145* (2013.01); *B65D 5/38* (2013.01)

(58) Field of Classification Search
CPC .................................. B65D 5/38; B42F 7/145
USPC .................................................. 206/804, 425
See application file for complete search history.

(56) References Cited

U.S. PATENT DOCUMENTS 2,277,097 A * 3/1942 Hansen .................... B65D 5/38
206/121
2,799,441 A * 7/1957 Nerney .................. B65D 5/728
229/122.34
3,358,824 A * 12/1967 Stagnitto .............. A61J 7/0076
235/487

(Continued)

FOREIGN PATENT DOCUMENTS

JP 62-18357 B2 4/1987
JP 06-30466 Y2 8/1994

(Continued)

*Primary Examiner* — Steven A. Reynolds
(74) *Attorney, Agent, or Firm* — PARK LAW FIRM

(57) ABSTRACT

The tray storage for easy storing and reading of documents according to the present invention comprises a storage box provided with an inner space of a rectangular prism having a closure on the top; and a tray slidingly received in the inner space of the storage box, wherein the tray comprises a plate-shaped tray body part slidingly assembled to the storage box while being arranged in parallel with the inner wall of the storage box; a knob part arranged in the center of the top edge of the tray body part, extending integrally from the tray body part, and being foldable along the top edge of the tray body part with respect to the tray body part; a bottom part of the cantilever type perpendicularly extending from the tray body part along the bottom edge of the tray body part; and a separation preventing barrier of the cantilever type being folded upward from the bottom part to be parallel with the tray body part.

3 Claims, 5 Drawing Sheets

(56) References Cited

U.S. PATENT DOCUMENTS

| | | | | | |
|---|---|---|---|---|---|
| 3,899,125 | A * | 8/1975 | Andrews | B65D 5/6688 | 206/268 |
| 4,085,841 | A * | 4/1978 | Matsuyama, Glen | B65D 5/5009 | 206/385 |
| 10,696,443 | B1 * | 6/2020 | Mundt | B65D 43/12 | |
| 2012/0267267 | A1 * | 10/2012 | Preece | G11B 33/0494 | 206/308.1 |

FOREIGN PATENT DOCUMENTS

| | | | |
|---|---|---|---|
| JP | 3228257 | U | 10/2020 |
| KR | 20-0437105 | Y1 | 11/2007 |
| KR | 10-2018-0068081 | A | 6/2018 |

* cited by examiner

[Fig. 1]
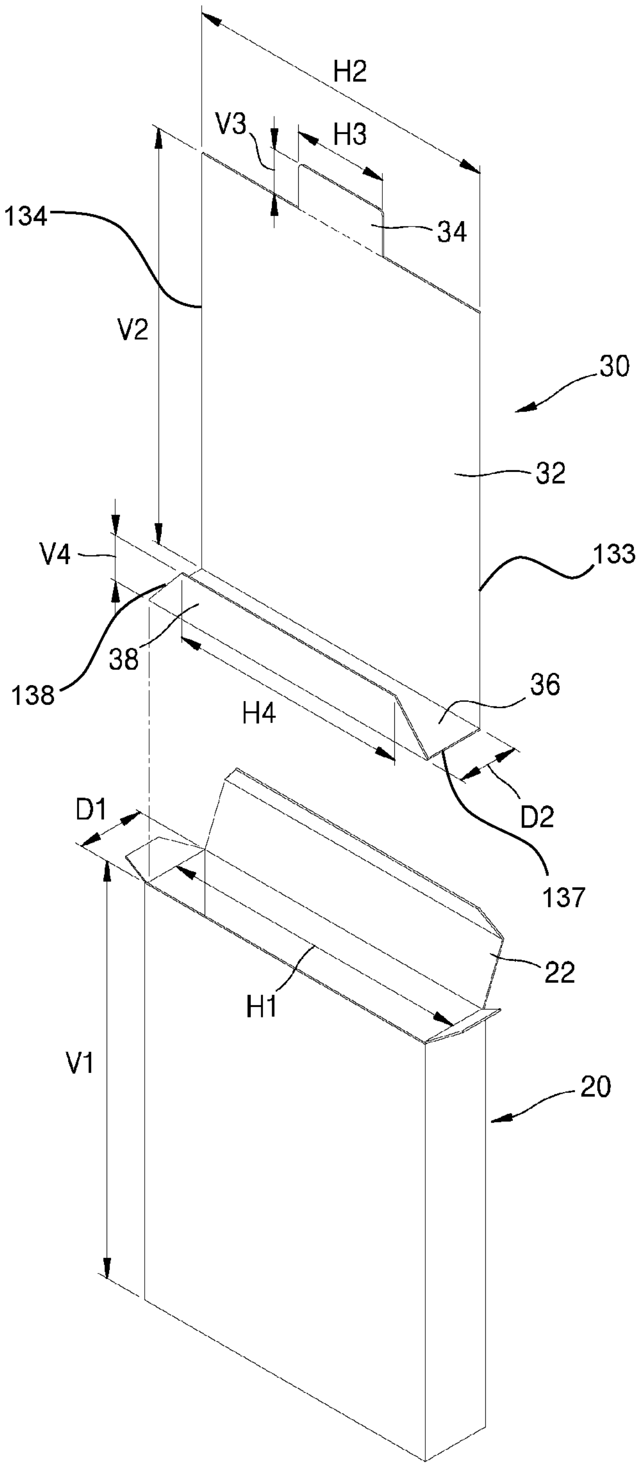

[Fig. 2]
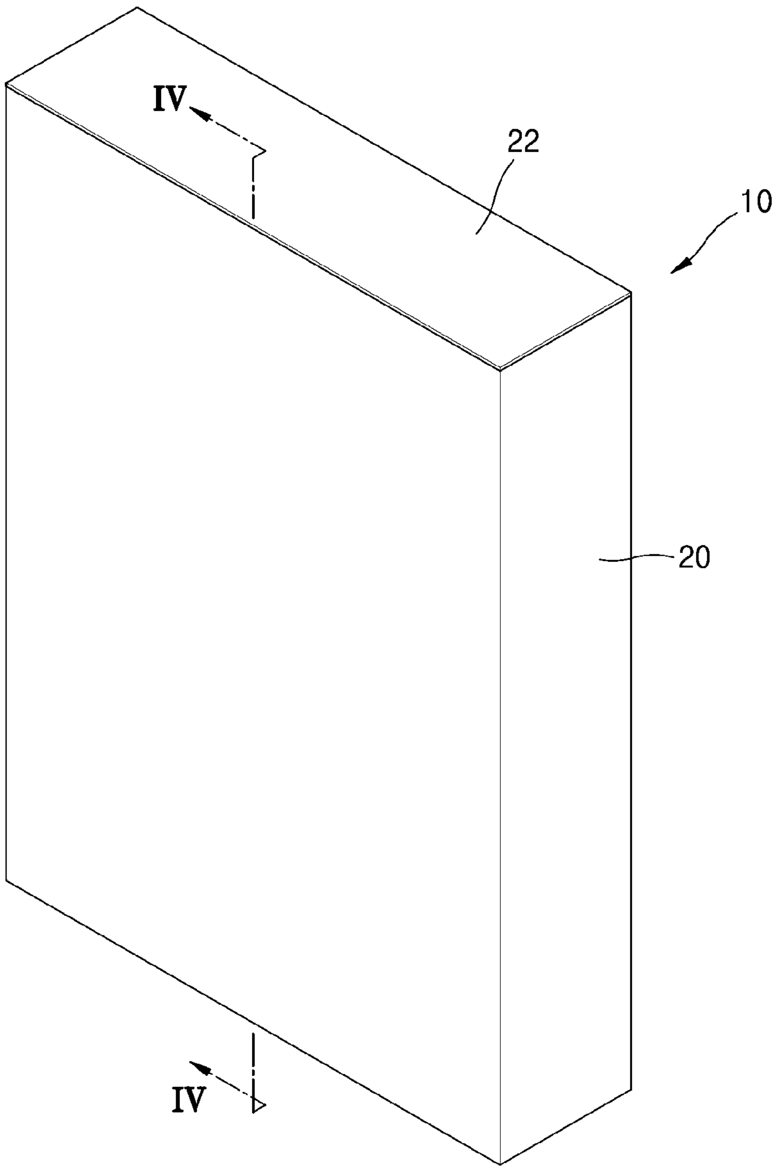

[Fig. 3]
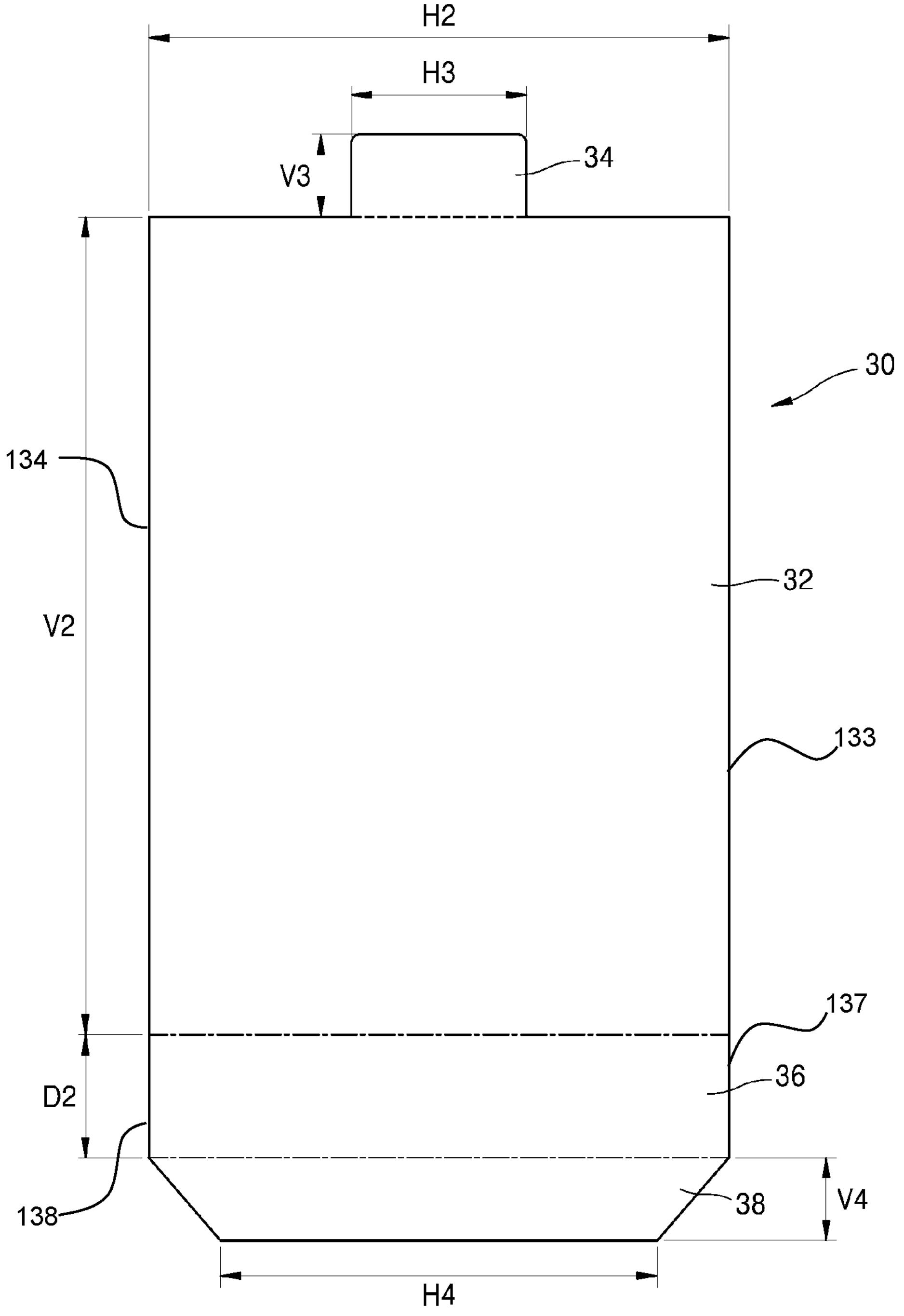

[Fig. 4]
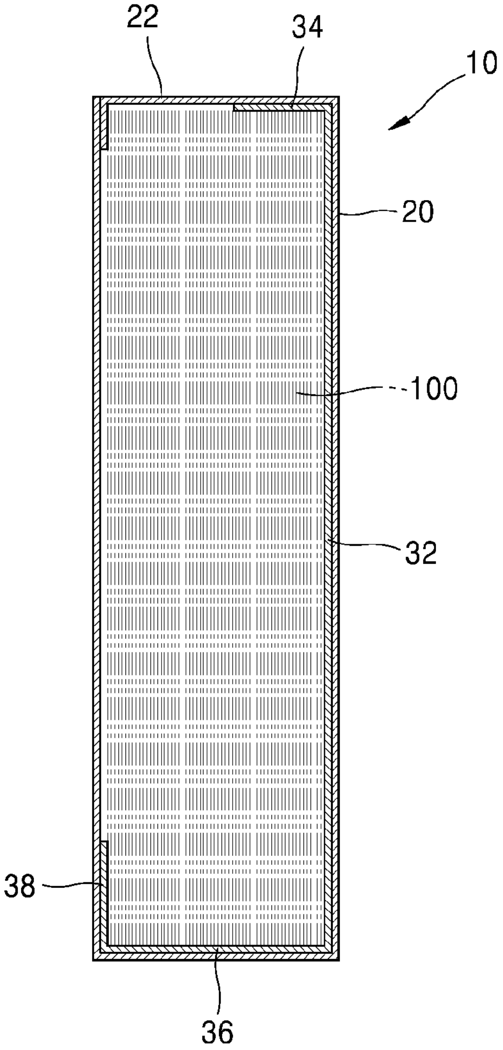

[Fig. 5]
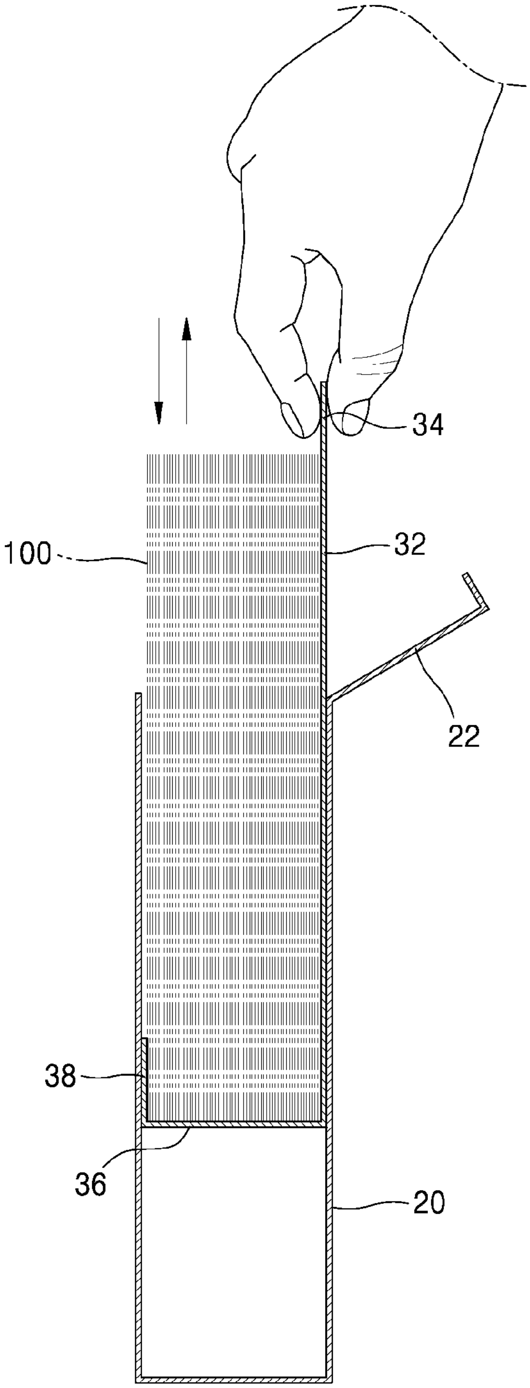

TRAY STORAGE

TECHNICAL FIELD

The present invention relates to a structure of a tray storage for storing documents. More specifically, the present invention relates to a tray storage for placing documents in a tray and storing the documents in a storage box.

BACKGROUND ART

In general, documents are arranged in files for long-term storage. There are ways of filing, such as putting a bundle of paper into files after punching holes in the paper, inserting a bundle of paper into clear pockets in files, fastening a bundle of paper by spiral binding, or binding a bundle of paper with an adhesive. However, when filing documents for storage, time and effort should be spent in filing, which results in a waste of time and labor. Furthermore, when using conventional filing ways, documents may be easily damaged while holes are punched in the documents or staples are removed from the documents to insert the documents into clear pockets. In addition, when binding documents using an adhesive, the original documents may be inevitably damaged.

SUMMARY OF INVENTION

Technical Task

The present invention has been made in an effort to solve the aforementioned problems, and it is an object of the present invention to provide a tray storage with an improved structure capable of easily storing documents without damage and easily taking out the stored documents for reading.

Means for Solving the Task

In order to achieve the aforementioned objects, the tray storage for easy storing and reading of documents according to the present invention comprises a storage box provided with an inner space of a rectangular prism having a closure on the top; and a tray slidingly received in the inner space of the storage box, wherein the tray comprises a plate-shaped tray body part slidingly assembled to the storage box while being arranged in parallel with the inner wall of the storage box; a knob part arranged in the center of the top edge of the tray body part, extending integrally from the tray body part, and being foldable along the top edge of the tray body part with respect to the tray body part; a bottom part of the cantilever type perpendicularly extending from the tray body part along the bottom edge of the tray body part; and a separation preventing barrier of the cantilever type being folded upward from the bottom part to be parallel with the tray body part, wherein the horizontal length H3 of the knob part is 3% to 25% of the horizontal length H2 of the tray body part, both ends of the separation preventing barrier are rounded or cut diagonally, and the vertical length V4 of the separation preventing barrier is 3% to 50% of the vertical length V2 of the tray body part.

Effect of Invention

The tray storage for easy storing and reading of documents according to the present invention has the effects of avoiding damage to the stored documents by virtue of a tray slidingly received in a storage box and enabling rapid storing of documents and reading of the stored documents. Also, the tray according to the present invention can be manufactured by folding a deployed plate material, which saves manufacturing costs. Also, the storage box according to the present invention can be made of a single material, without using materials harmful to the environment, such as plastic or metal, which have been used in conventional document filings, and thus can minimize environmental contamination. Also, the tray storage for easy storing and reading of documents according to the present invention is available not only for documents but also for various packaging fields.

BRIEF DESCRIPTION OF DRAWINGS

FIG. 1 is an exploded perspective view of a tray storage for easy storing and reading of documents according to the present invention;

FIG. 2 is a view illustrating the state in which the tray and the storage box in FIG. 1 are combined with each other;

FIG. 3 is a development view of the tray in FIG. 1;

FIG. 4 is a cross-sectional view taken along line Iv-Iv in FIG. 2; and

FIG. 5 is a view illustrating the state in which documents are stored in or taken out of the storage box in FIG. 1.

BEST MODE FOR CARRYING OUT THE INVENTION

Hereinafter, preferred embodiments according to the present invention will be explained in detail with reference to the accompanying drawings.

FIG. 1 is an exploded perspective view of a tray storage for easy storing and reading of documents according to the present invention. FIG. 2 is a view illustrating the state in which the tray and the storage box in FIG. 1 are combined with each other. FIG. 3 is a development view of the tray in FIG. 1. FIG. 4 is a cross-sectional view taken along line Iv-Iv in FIG. 2. FIG. 5 is a view illustrating the state in which documents are stored in or taken out of the storage box in FIG. 1.

Referring to FIG. 1 to FIG. 5, the tray storage 10 for easy storing and reading of documents according to the present invention (hereinafter "tray storage") comprises a storage box 20 and a tray 30.

The storage box 20 is a box-shaped structure provided with an inner space of a rectangular prism having a closure 22 on the top. The storage box 20 may be made of a material, for example, paper, fiber, wood, rubber, synthetic resin, etc. For example, the storage box may be manufactured by cutting and folding plate-shaped paper. The closure 22 may be formed integrally with the storage box 20. The bottom of the storage box 20 may have a structure that can be opened and closed as the top or may have a closed structure.

The tray 30 is a member slidingly received in the inner space of the storage box 20. The tray 30 may be formed by cutting and bending a plate material, for example. The tray 30 may be made of a material, for example, paper, fiber, wood, rubber, synthetic resin, etc. When the tray 30 is made of paper, the weight of paper for use preferably ranges from 200 $g/m^2$ to 300 $g/m^2$. If the weight of paper is less than 100 $g/m^2$, the strength is insufficient. The plate material of the tray 30 is preferably thicker than the plate material of the storage box 20. The tray 30 preferably has a size similar to that of the inner space of the storage box 20. The tray 30 is preferably manufactured to be tightly received in the storage box 20. If the tray 30 is too large, it cannot be received in the inner space of the storage box 20. If the tray 30 is too small, a gap occurs between the tray 30 and the storage box 20, and thus the tray 30 cannot be fit into the storage box 20.

When the tray 30 is made of rubber or synthetic resin, the tray 30 may be manufactured by injection molding. In an embodiment in the drawings, the tray 30 is manufactured by paper folding.

The tray 30 comprises a tray body part 32, a knob part 34, a bottom part 36, and a separation preventing barrier 38.

The tray body part 32 is a rectangular plate-shaped structure. The tray body part 32 is slidingly assembled to the storage box 20 while being arranged in parallel with the inner wall of the storage box 20. The vertical length V2 of the tray body part is preferably the same or slightly less than the vertical length V1 of the inner space of the storage box. The horizontal length H2 of the tray body part is preferably almost the same as the horizontal length H1 of the inner space of the storage box. Specifically, the horizontal length H2 of the tray body part is preferably 90% to 98% of the horizontal length H1 of the inner space of the storage box. A decorative piercing pattern by die cutting may be formed in the tray body part 32. The die cutting is called "Thompson" cutting in the printing industry. Meanwhile, at least one of decorative picture, pattern, color, or design may be printed on the tray body part 32. Also, a decorative pattern may be provided on one or both surfaces of the tray body part 32. Meanwhile, the picture, pattern, color, etc., provided on the tray body part 32 may be attached to the surface of the tray body part 32 by a means such as an adhesive or a double-sided adhesive tape. Also, other types of loads than documents may be attached to the tray body part 32 by a means such as an adhesive or a double-sided adhesive tape. The other types of loads may be, for example, packets for medicines such as Tylenol® or green tea bags, etc.

As seen in FIGS., the tray body part 32 has a right-side tray edge 133 and a left-side tray edge 134, wherein the tray body part 32 terminates at the right-side tray edge 133 and does not extend beyond the right-side tray edge 133, and the tray body part 32 terminates at the left-side tray edge 134 and does not extend beyond the left-side tray edge 134. In addition, the bottom part 36 has a right-side bottom edge 137 and a left-side bottom edge 138, wherein the bottom part 36 terminates at the right-side bottom edge 137 and does not extend beyond the right-side bottom edge 137 and the bottom body part 36 terminates at the left-side bottom edge 138 and does not extend beyond the left-side bottom edge 138.

The knob part 34 is arranged in the center of the top edge of the tray body part 32. The knob part 34 extends integrally from the tray body part 32. The knob part 34 serves as a handle through which an external force can be applied to the tray 30 when taking out a document 100 stored in the inner space of the storage box 20. The knob part 34 is foldable by an external force with respect to the tray body part 32. Specifically, the knob part 34 is foldable along the top edge of the tray body part 32 with respect to the tray body part 32. The boundary between the tray body part 32 and the knob part 34 preferably has a folding guide line by creasing. The knob part 34 is folded into the inside naturally by creasing when the closure 22 of the storage box 20 is closed. When taking out the document 100, the knob part 34 serves as a handle through which an external force is applied by being unfolded with fingers. The vertical length V3 of the knob part is preferably less than the thickness D1 of the inner space of the storage box. Specifically, the vertical length V3 of the knob part is preferably 30% to 95% of the thickness D1 of the inner space of the storage box. The horizontal length H3 of the knob part is preferably less than the horizontal length H2 of the tray body part. Specifically, the horizontal length H3 of the knob part is preferably 3% to 25% of the horizontal length H2 of the tray body part. If the horizontal length H3 of the knob part is less than 3% of the horizontal length H2 of the tray body part, the knob part 34 cannot be properly grabbed. If the horizontal length H3 of the knob part is greater than 25% of the horizontal length H2 of the tray body part, the paper is wasted, which is not economical.

The knob part 34 is illustrated in the drawings to be of a rectangular shape, but may have different shapes such as square, semicircle, triangle, logo, cloud, etc. Meanwhile, the knob part 34 may be painted in all natural colors such as red, orange, yellow, green, blue, etc. The classification of information of the stored document 100 may be written or indicated in the knob part 34.

The bottom part 36 is a plate-shaped structure of the cantilever type, perpendicularly extending from the tray body part 32 along the bottom edge of the tray body part 32. That is, the bottom part 36 extends from the lower end of the tray body part 32 to be parallel with the bottom surface of the storage box 20. The boundary between the bottom part 36 and the tray body part 32 may have a folding guide line by creasing. The thickness D2 of the bottom part is preferably almost the same as the thickness D1 of the inner space of the storage box. Specifically, the thickness D2 of the bottom part is preferably 90% to 98% of the thickness D1 of the inner space of the storage box. If the thickness D2 of the bottom part is less than 90% of the thickness D1 of the inner space of the storage box, a big void occurs in which the document 100 cannot be stored, which is ineffective, and when taking out the document 100, the document 100 may be fallen out of the tray 30 and left in the storage box 20. If the thickness D2 of the bottom part is greater than 98% of the thickness D1 of the inner space of the storage box, the tray may not be smoothly pulled in and out.

The separation preventing barrier 38 is a structure extending from the bottom part 36. The separation preventing barrier 38 is a structure of the cantilever type, being folded upward from the distal end of the bottom part 36 to be parallel with the tray body part 32. The separation preventing barrier 38 prevents the document 100 supported on the bottom part 36 from separating in the thickness D2 direction of the bottom part. The separation preventing barrier 38 prevents the document 100 stored in the tray 30 from dropping from the bottom part 36, and surrounds the lower portion of the document 100 stored in the storage box 20. Accordingly, the separation preventing barrier 38 enables the entire document 100 to be carried upward along with the tray 30 as the tray 30 is pulled upward when taking out the document 100 from the storage box 20. The boundary between the separation preventing barrier 38 and the bottom part 36 may have a folding guide line by creasing. The horizontal length H4 of the separation preventing barrier may be the same as the horizontal length H2 of the tray body part. Both ends of the separation preventing barrier 38 may be rounded or cut diagonally. The vertical length V4 of the separation preventing barrier is preferably 3% to 50% of the vertical length V2 of the tray body part. If the vertical length V4 of the separation preventing barrier is less than 3% of the vertical length V2 of the tray body part, the document 100 may be easily separated from the bottom part 36. If the vertical length V4 of the separation preventing barrier is greater than 50% of the vertical length V2 of the tray body part, the paper is wasted, which is not economical. As the thickness D1 of the inner space of the storage box 20 is thicker, the vertical length V4 of the separation preventing barrier is preferably close to 50% of the vertical length V2 of the tray body part.

In the case of manufacturing the tray 30 from common paper, not special paper, at least one of the front surface or the rear surface of the tray 30 is preferably treated by gloss or matt lamination. The lamination treated on the tray 30 increases strength and also prevents moisture. In particular, when the inside of the storage box 20 is printed with color, image, etc., the lamination can prevent the tray 30 from being smeared with ink.

Hereinafter, the effects of the tray storage 10 comprising the aforementioned elements are explained in detail through a process of placing a document 100 in the tray 30 and storing the document in the storage box 20 and a process of taking out the stored document 100 for reading.

First, in order to store the document 100, the document 100 is placed in the tray 30. A way of placing the document 100 in the tray 30 is pushing the paper in the tray 30 and piling up the document, while arranging the tray body part 32 in parallel with the ground. When the document 100 is piled up as high as the depth of the bottom part 36, the tray 30 is made to stand up and slidingly combined with the storage box 20. Then, the closure 22 provided in the storage box 20 is closed. As the closure 22 is closed, the knob part 34 is pressed by a force of the closure 22 and folded to be parallel with the closure 22, as illustrated in FIG. 4. Through this process, the document 100 can be easily stored. During this process, a separate step of punching holes on the document 100 is not required, and thus the document 100 is not damaged. Also, no punching step is necessary, time and personnel effort can be reduced Now, a process of taking out a document 100 from the tray storage 10 for reading the stored document 100 is explained. The closed closure is opened. When the closure 22 is opened, a worker grabs the knob part 34 and pulls the tray 30 upward, as illustrated in FIG. 5. The tray 30 in which the document 100 is placed is separated from the storage box 20. The necessary document 100 can be easily taken out of the tray 30 for reading while the separated tray 30 is placed in parallel with or perpendicular to the ground.

The tray storage for easy storing and reading of documents according to the present invention has the effects of preventing damage to the stored documents by virtue of the tray slidingly received in the storage box, and enabling rapid storing of documents and reading of the stored documents. Also, the tray according to the present invention can be manufactured by folding a deployed plate material, which reduces manufacturing costs. Also, the storage box according to the present invention can be made of a single material, without using materials harmful to the environment, such as plastic or metal, which have been used in conventional document filings, and thus can minimize environmental contamination. Also, the tray storage for easy storing and reading of documents according to the present invention is available not only for documents but also for various packaging fields.

The present invention is explained in detail as above with preferred embodiments, but the present invention is not limited to the embodiments, Further, it is apparent that various modifications to the present invention can be made by a person having ordinary knowledge in the art within the technical spirit of the present invention.

MODE FOR CARRYING OUT THE INVENTION

In order to achieve the aforementioned objects, the tray storage for easy storing and reading of documents according to the present invention comprises a storage box provided with an inner space of a rectangular prism having a closure on the top; and a tray slidingly received in the inner space of the storage box, wherein the tray comprises a plate-shaped tray body part slidingly assembled to the storage box while being arranged in parallel with the inner wall of the storage box; a knob part arranged in the center of the top edge of the tray body part, extending integrally from the tray body part, and being foldable along the top edge of the tray body part with respect to the tray body part; a bottom part of the cantilever type perpendicularly extending from the tray body part along the bottom edge of the tray body part; and a separation preventing barrier of the cantilever type being folded upward from the bottom part to be parallel with the tray body part, wherein the horizontal length H3 of the knob part is 3% to 25% of the horizontal length H2 of the tray body part, both ends of the separation preventing barrier are rounded or cut diagonally, and the vertical length V4 of the separation preventing barrier is 3% to 50% of the vertical length V2 of the tray body part.

The vertical length of the knob part is preferably 30% to 95% of the thickness of the inner space of the storage box.

The thickness of the bottom part is preferably 90% to 98% of the thickness of the inner space of the storage box.

A decorative piercing pattern by die cutting is preferably formed in the tray body part.

Preferably, at least one of decorative picture, pattern, color, or design is printed on the tray body part or a load other than documents is attached to the tray body part.

At least one of the front surface or the rear surface of the tray is preferably treated by gloss or matt lamination.

What is claimed is:

1. A tray storage for easy storing and reading of documents, comprising:

a storage box provided with an inner space of a rectangular prism having a closure on the top; and a tray slidingly received in the inner space of the storage box, wherein the tray consists of a plate-shaped tray body part slidingly assembled to the storage box while being arranged in parallel with an inner wall of the storage box; a knob part arranged in a center of a top edge of the tray body part, extending integrally from the tray body part, and being foldable along the top edge of the tray body part with respect to the tray body part; a bottom part of the cantilever type perpendicularly extending from the tray body part along a bottom edge of the tray body part; and a separation preventing barrier of the cantilever type being folded upward from the bottom part to be parallel with the tray body part, and wherein the horizontal length H3 of the knob part is 3% to 25% of the horizontal length H2 of the tray body part, both ends of the separation preventing barrier are rounded or cut diagonally, and the vertical length V4 of the separation preventing barrier is 3% to 50% of the vertical length V2 of the tray body part.

2. The tray storage of claim 1, wherein the vertical length of the knob part is 30% to 95% of the thickness of the inner space of the storage box.

3. The tray storage of claim 1, wherein the thickness of the bottom part is 90% to 98% of the thickness of the inner space of the storage box.

* * * * *